Aug. 2, 1927.

C. E. GIRTEN 1,637,694

BELT CLAMP

Filed Jan. 4, 1926

Charles E. Girten
Inventor

By Hardway Cathy
Attorneys

Patented Aug. 2, 1927.

1,637,694

UNITED STATES PATENT OFFICE.

CHARLES E. GIRTEN, OF HOUSTON, TEXAS.

BELT CLAMP.

Application filed January 4, 1926. Serial No. 79,078.

This invention relates to new and useful improvements in a belt clamp.

One object of the invention is to provide a fastener of the character described whereby the ends of a belt may be securely fastened together.

Another object of the invention is to provide a clamp or fastener for securing together the ends of a belt, and which is flexible so as to conform to the circular contour of the pulleys, or sheaves, over which the belt is designed to work.

With the above and other objects in view this invention has particular relation to certain novel features of construction, operation and arrangement of parts an example of which is given in this specification and illustrated in the accompanying drawings, wherein:—

Figure 1:
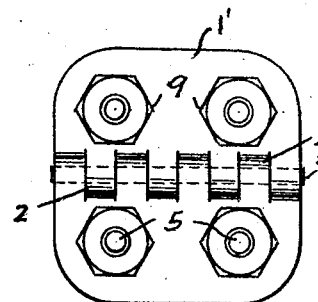
Figure 1 shows a plan view of one form of the clamp.

Referring now more particularly to the drawings, wherein like numerals of reference designate similar parts on each of the figures the numeral 1 designates the conventional type of belt of any desired kind of belting material.

The clamp for fastening the ends of the belt together comprises the plates 1', 1', whose adjoining edges are formed with spaced tenons 2, the tenons of one plate being staggered with respect to those of the other plate, said tenons being provided with aligned bearings 3 to receive the pintle 4, by means of which the clamp plates 1', 1', are united together. These respective plates are secured to the outer sides of the respective ends of the belt, to be joined together by means of the bolts 5, which are passed through the belt and through the aligned openings in said plates. The inner ends of these bolts have enlarged heads 6 whose inner sides are convex and provided with barbs 7 which engage in the material of the belt. The sides of the plates, opposite said heads, have concaved recesses 8 and the outer ends of the bolts are threaded to receive the nuts 9 and when the nuts are screwed up the heads 6 are buried into the material of the belt with their outer surfaces flush therewith so as to give a smooth inner side to the belt joint, to the end that the joint will present a smooth surface to the pulleys over which the belt works.

Figure 5:
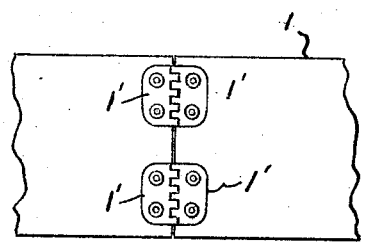
Figure 5 shows a section of a belt whose ends are connected by the type of clamp herein described.

Two of the clamps will usually be employed for a belt joint as shown in Figure 5, but more may be used, if desired.

Figure 2:
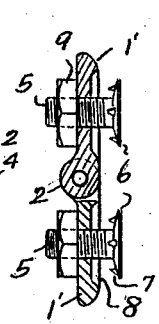
Figure 2 shows a cross sectional view thereof.
Figure 3:
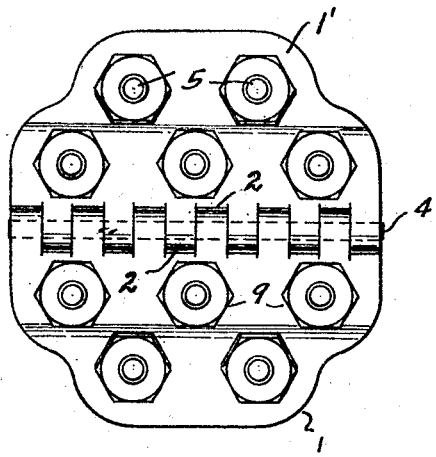
Figure 3 shows a plan view of another form of the clamp.
Figure 4:
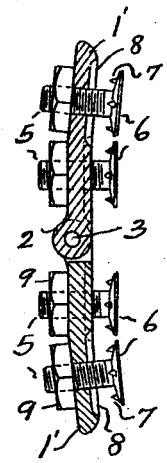
Figure 4 shows a cross sectional view thereof.

In Figures 1, 2 and 5 only two bolts are employed for each clamp plate, but when a heavy load is carried by the belt more of said bolts may be used, as illustrated in Figures 3 and 4, said bolts being arranged in rows, the bolts of one row being staggered with respect to the bolts of the other row. In the form shown in Figures 3 and 4 the clamp plates are slightly arcuate to conform to the pulleys over which the belt works.

What I claim is:

1. A fastener for belts, and the like, comprising arcuate plates hinged together, bolts fitted through the belt ends and through the corresponding plates, the inner ends of the bolts having enlarged heads, barbs carried by the head, the facing sides of the plates having recesses which coincide with said heads and nuts threaded onto the outer ends of said bolts.

2. A fastener for belts, and the like, comprising arcuate plates jointed together, each plate having bolt receiving openings and concaved recesses on one side around said openings, bolts fitted through said openings, each bolt having an enlarged head which aligns with and whose facing side conforms to the contour of the corresponding recess and a nut threaded onto the other end of said bolt and barbs on the head adapted to bite into the belt when the nut is screwed down onto the belt.

3. A fastener for belts including plates in pairs whose adjoining edges are formed with alternate spaced tenons which intermesh and are provided with aligned bearings, a pintle fitted through said bearings, each plate being slightly curved and being provided with bolt holes formed with surrounding concaved recesses on one side of each plate, bolts fitted through said holes having enlarged heads whose inner sides are convex to conform to the shape of said recesses, the convex sides of said heads being provided with barbs, the other ends of said bolts being threaded and nuts threaded thereon.

In testimony whereof I have signed my name to this specification.

CHARLES E. GIRTEN.